May 30, 1933.  W. HOLSTEIN  1,911,570
HOSE NIPPLE
Filed Dec. 11, 1929
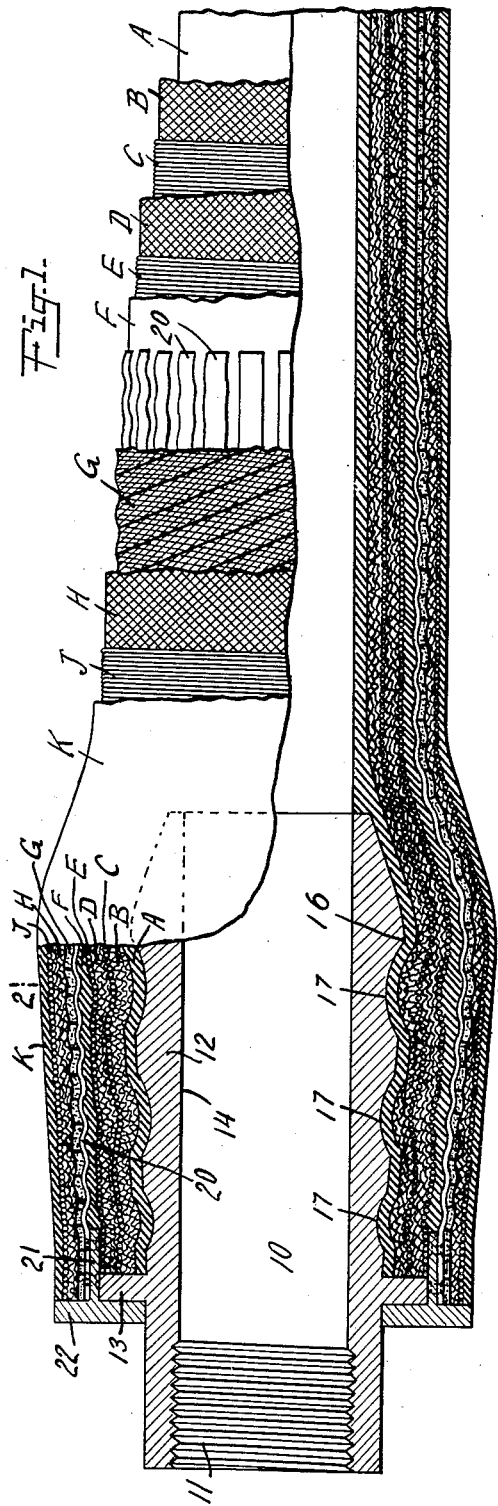
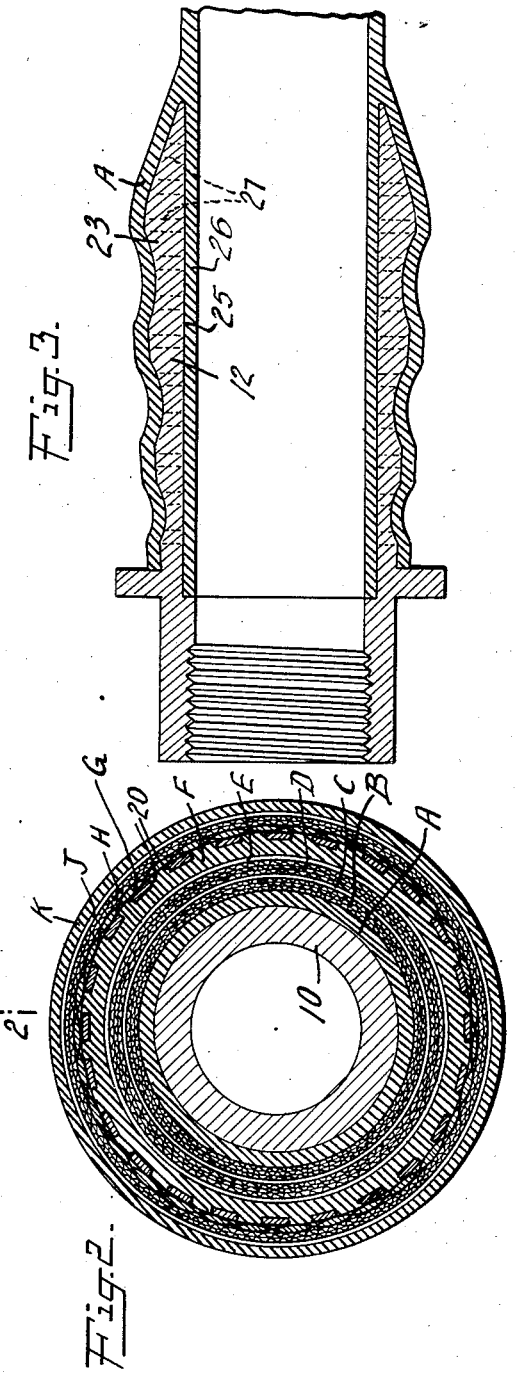
INVENTOR
William Holstein
BY
ATTORNEYS.

Patented May 30, 1933

1,911,570

UNITED STATES PATENT OFFICE

WILLIAM HOLSTEIN, OF BEACON, NEW YORK, ASSIGNOR TO NEW YORK RUBBER CORPORATION, OF NEW YORK, N. Y., A CORPORATION OF NEW YORK

HOSE NIPPLE

Application filed December 11, 1929. Serial No. 413,305.

This invention relates to nipple constructions and particularly to nipples for high pressure hose.

Flexible reinforced hose used in oil well operations must withstand very severe usage and tremendous pressures. It has been found very difficult to so connect a nipple to high pressure hose as to prevent the nipple from pulling loose or being disconnected from the hose.

For instance, when subjected to pressures upward of one thousand to fifteen hundred pounds, the stretch in a reinforced hose often amounts to several feet and this elongation or longitudinal stretching of the hose causes the hose to pull away from the nipple.

This invention has for one of its objects to provide a nipple so constructed and so secured to a hose that the nipple will not pull loose from the hose under heavy pressures and the severe conditions of use to which such hose is subjected.

Another object of the invention is to provide a nipple so constructed that any elongation of the hose due to pressure will cause the hose to more tightly grip the nipple.

Further objects of the invention will appear from the following specification taken in connection with the drawing which form a part of this application, and in which Fig. 1 is an elevational view, partly in section, of a nipple constructed in accordance with the invention and secured to a reinforced hose;

Fig. 2 is a transverse sectional elevation taken substantially on line 2—2 of Fig. 1; and Fig. 3 is a detail sectional elevation showing a slightly modified form of nipple constructed in accordance with the invention.

The invention briefly described consists of a nipple having a threaded portion adapted for connection to a coupling member and an elongated sleeve having its outer surface tapered from end to end and greater in diameter adjacent the end of the sleeve remote from the threaded portion or, in other words, the end of the sleeve which projects farthest into the hose. The outer surface of the sleeve portion of the nipple is also preferably provided with annular recesses or is undulated. A flange may be formed between the tapered portion of the sleeve and the threaded portion of the nipple and the nipple is secured in the end of the reinforced hose by forming or constructing the hose thereon. The hose has preferably embedded therein in the portion surrounding the nipple sleeve, longitudinally extending corrugated or undulating strips, these strips extending in the hose longitudinally thereof and beyond the inner end of the nipple sleeve. The strips materially assist in securing the hose to the nipple and are preferably carried by a ring which abuts against the nipple flange.

Further details of the invention will appear from the following description.

In the embodiment of the invention illustrated in the drawing, there is shown a nipple 10 comprising a threaded portion 11, a sleeve 12, and a laterally extending flange 13 disposed intermediate the sleeve and the threaded portion. The inner wall 14 of the sleeve is cylindrical, the inner diameter corresponding to the inside diameter of the hose to which the nipple is to be secured.

The sleeve 12 is tapered in thickness from the end adjacent the flange 13, which may be termed the outer end, to the opposite or inner end thereof, the greatest diameter being reached at 16. Beyond the point 16 the sleeve tapers downwardly. The outer surface of the sleeve in addition to being tapered is provided with annular depressions or grooves 17.

The nipple construction above described has been designed particularly for use on, reinforce hose and in Fig. 1 the hose is illustrated as comprising a plurality of layers of rubber duck, spiral windings of wire, and spiral windings of flat or stranded wire. As illustrated in Fig. 1, a layer A of rubber surrounds and contacts with the outer surface of the sleeve 12. This layer is surrounded by a plurality of layers B of duck. A layer C of wire is tightly wound spirally around the layers of duck and is in turn surrounded by a plurality of layers D of duck. Another spiral winding E surrounds the layers D and a layer F of rubber surrounds the spiral winding of wire E.

A plurality of corrugated metallic strips 20 are carried by an annular band 21, which in turn is carried by an annular washer 22 mounted on the outer surface of the threaded portion 11 of the nipple and abutting the flange 13. The strips 20 extend longitudinally in the hose and attention is directed to the fact that these strips extend materially beyond the end of the nipple. The corrugated strips 20 are surrounded by and are tightly held in position by a spiral winding G of stranded or flat wire. A plurality of layers H of duck surround the spiral wire winding G and another spiral winding of wire J surrounds the layers H. The winding J is in turn surrounded by an outer layer K of rubber. It will be understood that the exact arrangement of the layers of material outlined in the preceding description need not be followed but that the various layers or windings may be arranged in any desired manner. Attention is called to the fact, however, that the hose is built up by winding the various layers under great pressure and therefore the portion of the reinforced hose surrounding the sleeve tightly grips the outer surface of the sleeve. The corrugated strips 20 also materially assist in preventing any longitudinal movement of the hose relative to the sleeve and assist in preventing any rupture of the hose at or adjacent the inner end of the sleeve 12.

If desired, the sleeve portion 12 of the nipple may be recessed, as shown at 25 in Fig. 3, and a rubber tube or lining 26 may be positioned in the recess. The sleeve 23 of the nipple shown in Fig. 3 is illustrated as provided with transverse openings 27 therethrough. The internal pressure in the nipple will tend to cause portions of the rubber lining 26 to be forced into the openings 27 and the pressure of the windings surrounding the sleeve will cause portions of the layer A of rubber to enter the outer ends of the openings 27. The offsetting or forcing of portions of rubber on the inside and outside of the sleeve into the openings 27 will obviously assist in preventing the nipple and sleeve from pulling loose from the hose.

From the foregoing description it will be clear that any elongation of the hose due to the tremendous pressure therein will cause the hose to more tightly grip the nipple, due to the external taper of the nipple sleeve. The corrugated metallic strips also materially assist in preventing the hose from pulling loose from the nipple and in preventing rupture of the hose adjacent the inner end of the nipple.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. A hose nipple comprising a sleeve having an undulating outer surface, a flange at one end of the sleeve, a plurality of strips adapted to be embedded in a hose surrounding the sleeve and extend longitudinally therein, and means associated with said flange for holding said strips in position and against longitudinal movement relative to said nipple.

2. A hose nipple comprising a sleeve having an undulating outer surface, a flange at one of the sleeve, a plurality of corrugated strips adapted to be embedded in a hose surrounding the sleeve and extend longitudinally therein, and means associated with said flange for holding said strips in position and against longitudinal movement relative to said nipple.

3. A hose nipple comprising a sleeve, a flange at one end of the sleeve, a plurality of strips adapted to be embedded in the hose and extend longitudinally therein, and means associated with said flange for holding said strips in position and against longitudinal movement relative to said nipple.

4. A hose nipple comprising a sleeve having an uneven outer surface, a flange at one end of the sleeve, a washer abutting said flange, and a plurality of metallic strips carried by said washer and adapted to be embedded in a hose.

5. A hose nipple comprising a sleeve having an uneven outer surface, a flange at one end of the sleeve, a washer abutting said flange, and a plurality of metallic strips longer than the sleeve carried by said washer, adapted to be embedded in a hose, and to extend beyond the inner end of the sleeve.

6. A hose nipple comprising a sleeve having an uneven outer surface, a flange at one end of the sleeve, a washer abutting said flange, and a plurality of corrugated, metallic strips carried by said washer and adapted to be embedded in a hose.

WILLIAM HOLSTEIN.